United States Patent
Stark et al.

(10) Patent No.: US 9,132,924 B2
(45) Date of Patent: Sep. 15, 2015

(54) DEVICE FOR SPATIALLY ORIENTING AT LEAST TWO SUBGROUP COMPONENTS AND METHOD

(75) Inventors: Ulrich Stark, Stade (DE); Jörg Schrickel, Deinste (DE); Wolfgang Brandt, Elmshorn (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 710 days.

(21) Appl. No.: 13/318,364

(22) PCT Filed: Apr. 30, 2010

(86) PCT No.: PCT/EP2010/055878
§ 371 (c)(1),
(2), (4) Date: Jan. 5, 2012

(87) PCT Pub. No.: WO2010/125172
PCT Pub. Date: Nov. 4, 2010

(65) Prior Publication Data
US 2012/0130528 A1    May 24, 2012

Related U.S. Application Data

(60) Provisional application No. 61/174,502, filed on May 1, 2009.

(30) Foreign Application Priority Data

May 1, 2009    (DE) .......................... 10 2009 018 991

(51) Int. Cl.
*G06F 19/00*    (2011.01)
*G01B 11/26*    (2006.01)
(Continued)

(52) U.S. Cl.
CPC ............... *B64F 5/0009* (2013.01); *B23P 19/10* (2013.01); *B23P 2700/01* (2013.01)

(58) Field of Classification Search
CPC .................................................... G05B 19/402
USPC ........................................................ 700/114
See application file for complete search history.

(56) References Cited

U.S. PATENT DOCUMENTS 4,937,768 A * 6/1990 Carver et al. ..................... 703/1
5,380,978 A * 1/1995 Pryor ....................... 219/121.64
(Continued)

FOREIGN PATENT DOCUMENTS

CN    1103344 A    6/1995
CN    1165332 A    11/1997
(Continued)

OTHER PUBLICATIONS

"Neural Network Control of a Pneumatic Robot Arm" from "IEEE Transactions on Systems, Man and Cybernetics. vol. 24 No. 1 Jan. 1994".*

(Continued)

*Primary Examiner* — Mohammad Ali
*Assistant Examiner* — Yuhui R Pan
(74) *Attorney, Agent, or Firm* — Carter, DeLuca, Farrell & Schmidt, LLP

(57) ABSTRACT

A device for spatially aligning at least two large-format subassembly components, particularly at least one side shell, at least one upper shell, at least one lower shell and/or at least one floor structure, relative to each other for integrating a component, particularly a fuselage section of an aircraft, is provided which includes:
at least two positioning devices for taking up in each case a subassembly component, particularly at least two side shell positioners, at least one upper shell positioner and/or at least one lower shell positioner,
at least one measuring device for acquiring a multitude of measured data, particularly of positioning data relating to the subassembly components and/or to the positioning devices,
at least one control and/or regulating device, particularly at least one CNC control system, and
at least one neuronal network.
Moreover, a method for aligning the subassembly components is also provided.

14 Claims, 2 Drawing Sheets

(51) Int. Cl.
*B64F 5/00* (2006.01)
*B23P 19/10* (2006.01)

(56) References Cited

U.S. PATENT DOCUMENTS

| | | | |
|---|---|---|---|
| 5,788,158 A * | 8/1998 | Relyea | 239/166 |
| 6,237,210 B1 * | 5/2001 | Stoewer et al. | 29/430 |
| 6,898,484 B2 | 5/2005 | Lemelson et al. | |
| 2004/0107576 A1 * | 6/2004 | Hung | 29/894.353 |
| 2010/0049354 A1 * | 2/2010 | Stark et al. | 700/110 |
| 2010/0268423 A1 * | 10/2010 | Breed | 701/45 |
| 2010/0286824 A1 * | 11/2010 | Solomon | 700/248 |

FOREIGN PATENT DOCUMENTS

| | | |
|---|---|---|
| CN | 1391084 A | 1/2003 |
| DE | 10 2004 056286 A1 | 5/2006 |
| DE | 102004056287 A1 | 5/2006 |
| DE | 10 2006 019917 A1 | 11/2007 |
| DE | 10 2007 028918 A1 | 1/2009 |
| EP | 0 641 624 A1 | 3/1995 |
| EP | 0 751 447 A1 | 1/1997 |
| JP | 2053582 A | 2/1990 |
| JP | 2003104527 A | 4/2003 |
| RU | 2226168 C1 | 3/2004 |
| RU | 2266558 C2 | 6/2005 |
| RU | 2007107468 A | 7/2009 |
| WO | WO 2007125097 A1 * | 11/2007 ........... G05B 19/402 |

OTHER PUBLICATIONS

Wells et al. "Vision-based robot positioning using neural networks" from "Image and Vision Computing 14 (1996) 715-732".*

International Search Report for Appln. No. PCT/EP2010/055878 mailed Mar. 28, 2011.
Office Action dated Mar. 26, 2010 to German Application No. 10 2009 018991 Al, Airbus Operations GmbH.
Office Action dated Feb. 8, 2013 to European Application No. 10719318, Airbus Operations GmbH.
Office Action dated Mar. 26, 2013 to Russian Application No. 2011148902.
Notice of Allowance dated Jul. 14, 2014 to Russian Application No. 2011148902.
Office Action dated Feb. 19, 2013 to Japanese Application No. 2012-507776, Airbus GmbH.
Office Action dated Jul. 4, 2014 to Chinese Application No. 2010800297450.
Search Report dated May 27, 2014 to Chinese Application No. 2010800297450.
Wollnack, J.: Synergie, Informatic, Robotik, Mikroelektronik, lasertechnik und Videometrie als Innovationsmotor (IRMLV-Projeckte), [erstellt am Oct. 30, 2001], [abgerufen am Mar. 26, 2010].
Wollnack, J.; Stepanek, P.: Iterativ Learnende Verfahren in der Groβ-bauteilmontage, 2004. S. 572-579, [abgerufen am Jan. 26, 2010].
Wollnack, J.: Bildverarbeitung, Industrieroboter, Fertigungstechnik, 3D/6D Visionsysteme in der Robotik, Vollautomatische Sensor-, Sensor-Greifer-und RoboterKalibration, 2007. S. 718-725, [abgerufen am Mar. 26, 2010].
Wollnack, J; Stepanek, P.: Montage, Automatisierung, Fertigungstechnik, Formkorrektur und Lagefür eine flexible und automatisierte Groβbauteilmontage, 2004, S. 414-421, [abgerufen am Mar. 26, 2010].

* cited by examiner

DEVICE FOR SPATIALLY ORIENTING AT LEAST TWO SUBGROUP COMPONENTS AND METHOD

TECHNICAL FIELD

The invention relates to a device for spatially aligning at least two large-format subassembly components, in particular at least one side shell, at least one upper shell, at least one lower shell and/or at least one floor structure, relative to each other for integrating a component, in particular a fuselage section of an aircraft.

Furthermore, the invention relates to a method for spatially aligning at least two subassembly components.

BACKGROUND

In modern aircraft construction, fuselage cells are usually manufactured in the so-called section assembly process. In this process, subassembly components such as, for example, side shells, upper and lower shells as well as floor structures and if applicable further system components such as, for example, technical equipment systems are integrated to form a fuselage section. The complete fuselage cell of an aircraft is then formed by a plural number of fuselage sections arranged one behind another.

Presently used production plants for manufacturing fuselage cells comprise positioning devices by means of which the subassembly components are taken up and spatially aligned in relation to each other. The necessary data for alignment is determined by means of a suitable measuring device. The actual alignment then takes place in a manually controlled manner in an iterative process. However, in this process, apart from meeting the required high fitting accuracy, it is, in particular, also necessary to limit the forces acting on the subassembly components, for example to prevent undefined self-deformation resulting from external mechanical forces acting on the subassembly components. However, as a result of these effects, the number of iterative processes and procedures to be carried out by the individual positioning devices until a predetermined desired position has been reached increases. Furthermore, in the case of manual positioning, for safety reasons as a rule only ever one positioning device moves at any given time. The above-mentioned disadvantages in the hitherto-used practice during assembly of fuselage sections or in the devices used for this purpose results in longer assembly times.

It is the object of the invention to create a device that makes it possible to set a predetermined desired geometric shape of subassembly components as quickly as possible and subsequently to move the subassembly components, by means of preferably simple traverse movements, to a position where they can be tacked and/or joined.

SUMMARY

This object is met by a device according to the present disclosure, which comprises the following characteristics:
a) at least two positioning devices for taking up in each case a subassembly component, in particular at least two side shell positioners, at least one upper shell positioner and/ or at least one lower shell positioner,
b) at least one measuring device for acquiring a multitude of measured data, in particular of positioning data relating to the subassembly components and/or to the positioning devices,
c) at least one control and/or regulating device, in particular at least one CNC control system, and
d) at least one neuronal network.

The positioning devices of the device support preferably automatic take-up and free positionability of at least two subassembly components, for example side shells, of an upper and a lower shell and of at least one floor structure, in three-dimensional space. In this process it should be taken into account that the large-format subassembly components, after they have been taken up by the positioning devices or the holding devices arranged thereon, due to their intrinsic flexibility must first be moved to a predetermined exactly defined desired geometry. Only after they have attained this desired geometric shape is it possible to move the subassembly components to a position where they can be tacked and joined, for example by traverse movements of the positioning devices. The geometric shape which first results in the subassembly components after they have been taken up in the positioning devices can only be described with the use of complex nonlinear mathematic algorithms.

For this purpose the device comprises at least one neuronal network that preferably serves to set a desired geometric shape, as determined in the construction specifications, of the at least two subassembly components by synchronous moving of the facilities. As a result of the simultaneously occurring traverse movements of the positioning devices, which traverse movements are monitored by the neuronal network, the time required to attain the desired geometric shape can be significantly reduced.

For supplementary or alternative controlling of the traverse movements of the positioning devices, moreover, at least one control and/or regulating device is required, which can, for example, be implemented with a known CNC control system. After the subassembly components have been moved to assume the intended desired geometric shape by means of the neuronal network, the subassembly components can be moved in a controlled manner by the CNC control system, for example by simple traverse movements, to a spatial position where they can be tacked and joined. Because the subassembly components have first been moved to assume a predetermined desired geometric shape by means of the neuronal network, there is a considerable reduction in the regulation-oriented and/or control-oriented effort required to control the traverse movements of the subassembly components until a state has been reached where they can be tacked and/or joined.

According to an advantageous embodiment of the device, by means of the at least one measuring device a spatial position of the subassembly components and/or of the positioning devices can be acquired.

As a result of this, highly-precise alignment of the subassembly components to be joined is possible. In this arrangement the positioning procedure is controlled by the at least one control and/or regulating device and/or by the at least one neuronal network.

An improvement of the device provides for the at least one measuring device to comprise at least one laser tracker and/or at least one photogrammetric system.

This makes it possible to achieve non-contacting acquisition of the respective spatial position of the subassembly components while at the same time providing high accuracy of better than 0.1 mm within the device. During acquisition of the spatial positioning data of the subassembly components by means of a laser tracker the subassembly components are preferably in each case provided with at least six reflective marks. In the case of a measuring system based on photogrammetric methods, such additional marks are not mandatory, however, by means of the resulting improvement in contrast in the image to be evaluated they can contribute to acceleration of the measuring procedure and/or to an improvement in measuring accuracy. As an alternative to this, it is also possible to use as a measuring device a laser-based GPS system suitable for indoor applications (a so-called "Indoor-GPS®"), which system generates a reference laser grid in the space.

An improvement of the device provides for the neuronal network to be designed so as to be hardware-based and/or software-based, in particular within the at least one control and/or regulating device.

Hardware-based implementation of the neuronal network provides, above all, speed advantages; however, it involves significantly greater system complexity. In contrast to this, a software-based solution can be directly integrated in a CNC control system, which generally speaking is required anyway for controlling the positioning devices, or in an arithmetic unit that is already provided for this purpose.

According to a further embodiment of the invention, the positioning data relating to the subassembly components, which positioning data has been acquired by the at least one measuring device, is conveyed to the control and/or regulating device as well as to the neuronal network.

This feedback of the spatial coordinates acquired by the measuring device to the at least one neuronal network as well as to the control and/or regulating device is required to produce a closed (linked-back) control and/or regulating circuit. As a result of this the control and/or regulating device as well as the neuronal network can detect any incorrect positioning of the subassembly components with little delay, and can counteract these deviations from a desired position by correspondingly moving the positioning devices.

According to an advantageous improvement of the device, the positioning devices in each case comprise at least one holding device for taking up and releasing at least one subassembly component, wherein the at least one holding device is controllable by means of the control and/or regulating device.

In this manner fully automatic taking up and if applicable fully automatic placing of subassembly components by means of the positioning devices becomes possible. The holding devices can, for example, be implemented with suction cups or with the use of spherical heads that can be inserted without any play into dome-shaped taking-up devices.

A further advantageous embodiment of the device provides for the positioning devices, in addition, to be controllable by means of a manual control device.

Because of this, operating personnel have recourse to additional intervention options in the case of an error occurring. Moreover, where necessary, manual control provides additional manual precision correction of the desired geometric shape of the subassembly components, which geometric shape has already been set by the neuronal network. The manual control device, for example in the form of a joystick, emits electrical signals that are immediately conveyed to the associated actuators of the positioning devices. The manual control signals have priority over any signals of the neuronal network and of the control and/or regulating device. As an alternative or as a supplement, positioning aids, such as for example laser lines or the like, can be provided in order to improve the accuracy of visual monitoring by an operator. The manual control device is preferably designed in such a manner that in each case only one positioning device can be manually moved by means of at least one actuator.

An improvement of the device provides for at least one tacking device to be provided in order to fix the mutual relative positions of at the least two subassembly components.

This obviates the need for transporting the subassembly components that have been properly aligned relative to each other to a separate, in other words spatially removed, tacking station and/or joining station, which transporting might result in uncontrolled position changes and in resulting dimensional deviations or displacements.

According to an advantageous improvement of the device, at least one joining device is provided in order to join the at least two subassembly components.

In this manner, after the initial process of correcting the three-dimensional geometric shape and after completion of the alignment as well as of optional tacking, at least two subassembly components can be joined to form a component.

According to an improvement of the device, in the region of the at least one positioning device at least one measuring sensor is arranged for determining further measured data, which measuring sensor is connected to the at least one control and/or regulating device and to the at least one neuronal network.

This makes possible a direct acquisition of measured data in the region of the positioning devices, for example direct displacement measurement and/or force measurement at the positioning devices.

In the case of a further advantageous embodiment variant of the device the at least one measuring sensor is a force transducer, in particular for acquiring deformation relating to the subassembly components; a displacement transducer, in particular for acquiring positioning data relating to the positioning devices; an angle of rotation transducer; a velocity transducer; an acceleration transducer; a temperature transducer; and/or an atmospheric humidity sensor.

In this manner it is possible, apart from the positioning data determined as a matter of priority in a non-contacting manner by the measuring device, which positioning data relates to the subassembly components or to the positioning devices, to acquire a multitude of further physical measured variables directly at the positioning devices, in particular, however, the exact position coordinates of the positioning facilities, in order to further optimise control of the positioning devices by the neuronal network and/or by the control and/or regulating device. In particular in the case of displacement transducers there can be direct mechanical coupling between the positioning device to be monitored and the measuring sensor.

Moreover, the object according to the invention is met by a method according to claim 12, which method comprises the following method-related steps:

a) inserting a subassembly component in each case in one of the at least two positioning devices, in particular in at least one side shell positioner, at least one upper shell positioner and/or at least one lower shell positioner, b) simultaneously moving the positioning devices under the control of at least one neuronal network and of at least one measuring device until a predetermined desired geometric shape has been attained, c) acquiring positioning data of the at least two subassembly components and/or of the positioning devices by means of the measuring device to determine an actual position, and d) aligning the subassembly components in a controlled manner by the at least one control and/or regulating device and/or by the at least one neuronal network by simultaneously moving the positioning devices based on an actual position in each case acquired by the measuring device and/or by measuring sensors until a desired position has been reached that is, in particular, suitable for tacking and/or joining the subassembly components.

In method-related step a) in each case at first a subassembly component is taken up by a positioning device or is inserted or placed into the aforesaid. For the purpose of taking up the subassembly components each positioning device comprises at least one, preferably however at least two, play-free holding devices or connecting devices. At their ends the holding devices are arranged on holding arms of the positioners; they can, for example, be designed as spherical heads that at least in some regions are insertable with positive fit into ball sockets. As an alternative, in particular in the case of subassembly components with smooth surfaces, it is also possible to use suction cups. The holding devices are preferably operable by the central control and/or regulating device, and are detachable from the respective subassembly component.

In method-related step b) the positioning devices with the subassembly components taken up thereon are simultaneously moved in a controlled manner by at least one neuronal network until a desired geometric shape of the subassembly components is attained, which shape has been predetermined on the basis of CAD component data. In this manner it is possible, prior to commencement of the alignment process, to eliminate initial undefined deformation of the subassembly components taken up in the positioning devices, such as for example weight-related self-deformation in the case of large-format subassembly components, temperature-related changes in length, and/or production-related dimensional deviations in the region of the positioning devices. Ideally the desired geometric shape of the subassembly components, which shape has been attained after method-related step b), corresponds to the shape predefined in the CAD component data. Moreover, this results in a reduction in the necessary programming effort and/or regulating effort for monitoring the traverse movements of the positioning devices, in particular until a position of the subassembly components is reached where they can be tacked and/or joined.

As an alternative or as a supplement to movement sequence control by the neuronal network, control of the movement sequences of the positioning devices can be carried out by at least one control and/or regulating device.

In order to cause the deformation of the subassembly components, which deformation is necessary to achieve the desired geometric shape, as a rule the introduction of mechanical forces into the subassembly components is necessary. As part of "force monitoring" the extent of these mechanical forces to be produced by the positioning devices is, in particular, continuously determined by the measuring sensors provided in the region of the positioning devices, which measuring sensors among other things are designed as force transducers, and is conveyed to the neuronal network and/or to the control and/or regulating device for further evaluation. By means of corresponding control of the actuators within the positioning devices, in the holding arms and in the holding devices or connecting devices, any introduction of inadmissibly high mechanical forces into the subassembly components to be joined can be prevented, and, consequently, permanent structural damage to the components to be joined and impermissibly high stress in the aligned subassembly components are excluded. In terms of the forces to be introduced, generally speaking a maximum limit value is provided, wherein, when this value is exceeded, any further change in the geometric shape of the subassembly component as a result of moving the positioning devices fails to materialise so as to prevent permanent damage to the subassembly component and/or to the positioning devices and holding devices involved.

In order to determine the actual geometric shape, at a given time, of each subassembly component, preferably a non-contacting measuring device is used, for example in the form of a laser tracker, an indoor GPS or a photogrammetric device. In the case of a laser tracker a multitude of laser reflectors are arranged so as to be distributed over the subassembly components, which laser reflectors make it possible to precisely acquire the respective actual geometric shape of the surface of the subassembly component in question. In the subsequent method-related steps the measuring device can also be used for acquiring the spatial position of the subassembly components and/or of the positioning devices, irrespective of any measuring sensors, in particular displacement transducers, in the region of the positioning devices.

After the at least two subassembly components in method-related step b) have been brought to a predetermined desired geometric shape, in method-related step c) the positioning data of the at least two subassembly components and/or of the positioning devices is determined by means of the at least one measuring device in order to determine a then current actual position of the subassembly components and/or of the positioning devices.

In method-related step d) then follows alignment of the subassembly components, controlled by the at least one control and/or regulating device and/or the at least one neuronal network by simultaneous movement of the positioning devices on the basis of the positioning data acquired by the measuring device and/or by the measuring sensors until, in particular, a desired position has been reached that is suitable for tacking and/or joining the subassembly components. After the predetermined desired position has been reached, to secure their positions the aligned subassembly components can be tacked and if applicable also finally joined by means of suitable devices. As an alternative or as a supplement, position monitoring can also take place by means of displacement transducers provided in the positioning devices.

As a result of the continuous transmission, to the control and/or regulating device controlling the alignment process and/or to the neuronal network, of the space coordinates acquired by the at least one measuring device and/or by the measuring sensors, a fast and precise alignment process can be achieved.

As already briefly mentioned above, acquisition of the positioning data of the subassembly components and/or of the positioning devices can take place by means of the measuring device, with laser trackers, with photogrammetric systems and/or with an indoor GPS, and consequently, generally speaking, measuring uncertainty of less than 0.1 mm can be achieved. In all cases the use of a laser tracker requires the affixation of so-called marks to the deformation-relevant reference points of interest on the respective subassembly component and/or to the positioning devices, if at the same time their movements are also to be acquired with the laser tracker.

For example, incrementally or absolutely operating linear displacement transducers and/or angle of rotation sensors can be used as measuring sensors in the region of the positioning devices. Suitable displacement transducers, in other words interference-resistant, low-wear and maintenance-free displacement transducers, operate, for example, on an inductive or visual basis. Apart from the displacement transducers, preferably at least force transducers are integrated in the positioning devices in order to be able to acquire the forces which during the traversing processes of the positioning devices act on the subassembly components, and in order to minimise the deformation of the subassembly components which as a rule results from said forces. Moreover, the positioning devices, the holding arms and/or the holding devices or the connecting devices can comprise angle of rotation transducers, velocity transducers, acceleration transducers, temperature transducers, humidity transducers and the like.

Temperature sensors are important in the compensation for temperature-related changes in dimensions of the, as a rule, large-format subassembly components, including the positioning devices. Based on the known temperatures, the traverse movements of the positioning devices can be compensated, and moreover the holding devices required to receive the subassembly components on the positioning devices can also be readjusted accordingly in order to prevent the occurrence of mechanical stress in the subassembly components, and in order to ensure highly precise alignment under all imaginable environmental conditions. Apart from the influence of temperature, other interference factors can exist that have an influence on the accuracy of the method in a relevant magnitude.

The laser tracker, the displacement transducers, the force transducers and all further optional measuring sensors provide the positioning data or the other physical measured data preferably directly in digital form so that the corresponding data can be conveyed in an interference-free manner to the control and/or regulating device and to the neuronal network, where it can quickly be further processed.

The control and/or regulating device can, for example, be implemented with the use of a known CNC control system by means of a standard PC cluster and/or with at least one process computer which preferably is able to directly access the CAD construction data of the subassembly components to be aligned. The at least one neuronal network can be implemented in an exclusively hardware-based and/or software-based manner on at least one standard industry PC or a powerful cluster comprising standard industry PCs.

According to a further improvement of the method, in a trial phase the neuronal network is taught until adequate correctness of its statements is achieved and from this an initial data set for a first method-related procedure with the neuronal network is generated.

The resulting initial data set is used as the first base for all subsequent method-related procedures and must be run through anew in relation to subassembly components of another nature.

As a consequence of the actual positioning data fed back to the neuronal network, and as a consequence of the further physical measured data relating to the positioning devices and to the subassembly components, the initial data set within the neuronal network is steadily improved with each further method-related procedure, and consequently highly precise alignment of the subassembly components relative to each other becomes possible in a very short time without any external manual intervention. Teach-in takes place with the use of the real subassembly components, including the positioning devices necessary for this, which subassembly components in the subsequent process are to be brought to assume a predetermined desired geometric shape and are subsequently to be aligned relative to each other. By means of a manual control device, manual corrections for improving the learning effect of the neuronal network are possible during the trial phase.

In the context of the above description, the term "correctness of a statement" of the neuronal network refers to the initial accuracy, achieved after completion of the teach-in phase, in relation to maintaining the desired geometric shape, as determined in the construction specifications, of the subassembly components, or to the alignment of the subassembly components in relation to each other within the device.

In contrast to this, the control and/or regulating device is analytically pre-programmed by means of known methods. Such programming can, for example, be implemented by the teach-in method or purely numerically on the basis of predetermined CAD coordinates relating to the subassembly components and/or to the positioning devices.

A further advantageous embodiment of the method provides for the initial data set during the method-related process to be improved step by step, in particular by continuous feed-in, to the at least one neuronal network, of position data determined by the at least one measuring device, and/or by the measured data determined by the at least one measuring sensor.

As a result of the effect of continuously feeding back to the neuronal network the positioning data or the measured data determined by the remaining measuring sensors, practically the teach-in phase is extended into normal operation of the neuronal network, and consequently the positioning accuracy is steadily improved and simultaneously the time required for this is reduced until an optimum is achieved.

DETAILED DESCRIPTION

Figure 1:
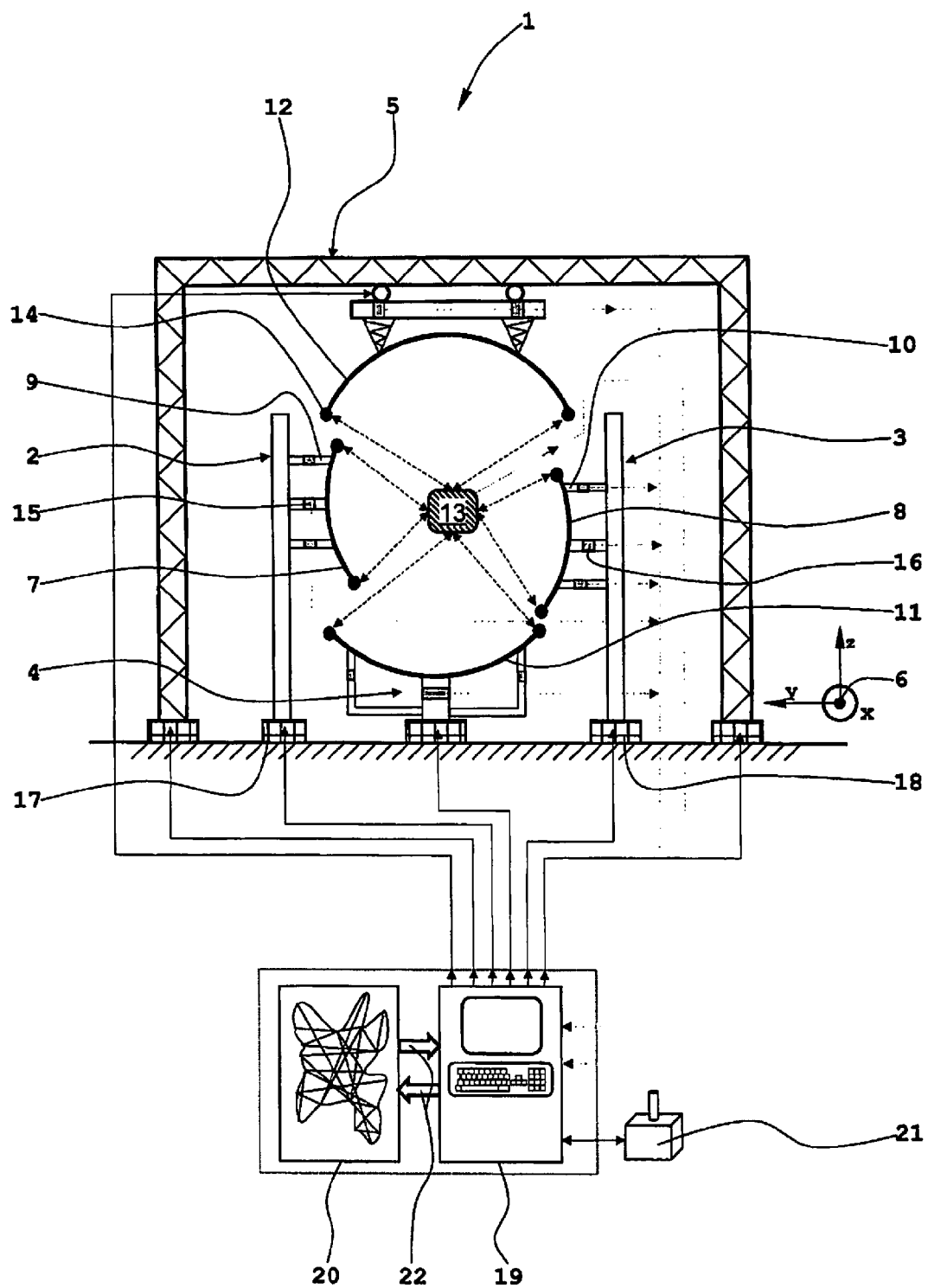
FIG. 1 is a basic illustration of a device.

Identical design elements in the drawing have the same reference characters.

FIG. 1 shows a diagrammatic view of the device according to the invention.

A device 1 among other things comprises two side shell positioners 2, 3, a lower shell positioner 4 and an upper shell positioner 5. Furthermore, at least one further positioning device is shown which can, for example, be designed as a presentation frame for alignment of at least one floor structure (not shown in FIG. 1). Moreover, two work platforms or boom lifts (for the sake of clarity also not shown) are provided, which are arranged on both sides of the upper shell positioner 5, in order to make it possible for operating personnel to manually intervene. A coordinate system 6 shows the spatial position of all the components shown in FIG. 1. Because of the size of the subassembly components that are to be taken up by the positioners 2 to 5, in a preferred embodiment variant of the device 1, in each case behind each of the positioners at least one further positioner is arranged so as to be offset in the direction of the x-axis.

On the two side shell positioners 2, 3 in each case a side shell 7, 8 is taken up by holding devices or connecting devices (not shown) that in each case are provided on the ends of three holding arms of the side shell positioners 2, 3. In a manner that is representative of all further holding arms the upper holding arms of the side shell positioners 2, 3 comprise the reference characters 9, 10.

Correspondingly a lower shell 11 is connected to the lower shell positioner 4 by means of three holding arms (also not shown) by way of holding devices arranged at their ends, and an upper shell 12 is suspended from the upper shell positioner 5—carried by two holding arms which each comprise a holding device on its end—so as to project from above into the device 1. As indicated by the coordinate system 6, the positioning devices 2 to 5 including the optional work platforms and the presentation frame can be freely moved at least parallel to the x-axis, the y-axis as well as the z-axis. Preferably, however, each one of the positioning devices comprises more than three independent degrees of freedom.

The two side shell positioners 2, 3 are designed so as to be slidable at least parallel to the x-axis, while the holding arms of the side shell positioners 2, 3 are movable at least parallel to the y-axis and to the z-axis. In co-operation with the two holding arms that are braced in a latticed manner, the upper shell positioner 5 makes it possible to spatially position the upper shell 12 at least parallel to the three axes of the coordinate system 6. As an alternative, rotatory movement sequences, if applicable also in combination with translatory movements, are also possible.

The same applies to the movement options of the lower shell 11 as well as to the positioning device (not shown) for manipulating the spatial position of the floor structure (not shown in the drawing). By way of the above-mentioned purely translatory movement options of the positioning devices parallel to the axes of the Cartesian coordinate system 6, which in each case represent three degrees of freedom in terms of each positioning device, the positioning devices can comprise further degrees of freedom, for example a further three rotatory movement options for each positioning device. In this manner the subassembly components in the device 1 can move on more complex movement paths, in other words in particular on any desired curved movement paths, and consequently spatial alignment is accelerated. Apart from the movement options, described above, of the positioning devices and of the holding arms arranged thereon, it is also possible for the holding devices or the connecting devices themselves to comprise several degrees of freedom in order to improve the positioning options of the subassembly components.

The two side shells 7, 8, the lower shell 11, the upper shell 12 as well as the floor structure (not shown) are finally to be mutually aligned in such a manner that these subassembly components assume a predetermined desired position in which at least provisional tacking or final joining to form a complete fuselage section of an aircraft is possible.

In order to acquire the respective current positioning data of the side shells 7, 8, of the lower shell 11 as well as of the upper shell 12 by means of a laser tracker 13, a multitude of reflectors as markers are arranged on the shells 7, 8, 11, 12, predominantly in the region of reference points that are relevant in terms of self-deformation, wherein one of these reflectors 14 comprises a reference character representative of all the others. In each case, the laser pulses or laser beams emitted by the laser tracker 13 and reflected by the reflectors are denoted by dashed double arrows. By means of the laser tracker 13 the exact positions of the subassembly components in the device, and thus if applicable in an indirect manner also the coordinates of the positioning devices themselves, can be determined to a precision of a few tenths of a millimeter. Instead of, or in addition to, the laser tracker 11 it is also possible, for example, to use a measuring device that is based on a photogrammetric system.

Furthermore, a multitude of measuring sensors are integrated in the two side shell positioners 2, 3, the upper shell positioner 5, the lower shell positioner 4 as well as in the floor structure positioner. Of these sensors, the measuring sensors located in the side shell positioners 2, 3 comprise reference characters 15, 16, representative of all the remaining measuring sensors. The measuring sensors are, for example, force transducers, by means of which the mechanical forces which in each case act on the subassembly components can be acquired in a differentiated manner. These forces can be caused by the traverse movements of the positioners and/or by the intrinsic weight of the subassembly components to be aligned, as well as by self-deformation induced by the aforesaid. In addition to the force transducers, further measuring sensors, for example displacement transducers, velocity transducers, acceleration transducers as well as angle of rotation transducers can be integrated. Moreover, temperature transducers and humidity transducers can be provided, in particular in order to acquire changes in the geometric shape of the subassembly components and/or of the positioning devices a result of thermal influences, and if applicable to be able to compensate for these changes.

Beyond this, each positioning device comprises at least one actuator or one electrical or hydraulic drive for any desired spatial movement of the positioning devices. In a manner that is representative of all the remaining actuators, two actuators in the two side shell positioners 2, 3 are designated with reference characters 17, 18. The actuators in the positioning devices preferably make it possible to obtain highly precise movement, without any play, of the positioning devices within the device in at least three degrees of freedom. The actuators can, for example, be implemented so as to be hydraulic, pneumatic and/or electric. Preferably, however, electrically-operated precision spindle drives are used.

Moreover, the device comprises at least one control and/or regulating device 19 as well as, according to the invention, at least one neuronal network 20, at the same level as the control and/or regulating device 19. For the purpose of data exchange the aforesaid are in permanent mutual connection by way of a bidirectional databus 22. The databus 22 makes it possible to maintain full information exchange between the control and/or regulating device 19 and the neuronal network 20. This means that the subassembly components are spatially freely moveable, by means of the actuators, both by the control and/or regulating device 19 and by the neuronal network 20. In addition, all the positioning data relating to the subassembly components, which data has been determined by the laser tracker 13, including the further physical measured data determined in the positioners and in the holding devices, is available, for further processing, both to the control and/or regulating device 19 and to the neuronal network 20.

All the positioning data, determined by the laser tracker 13, relating to the subassembly components including the further physical measured data determined by the measuring sensors, for example force measurement values, speed values, acceleration values and/or angle of rotation values of the positioning devices or of the subassembly components, is forwarded, as indicated by lines, to the control and/or regulating device 19, and thus at the same time is also made available to the neuronal network 20. Conversely, all the actuators of the positioning devices receive, as selected, from the control and/or regulating device 19 and/or from the neuronal network 20 a multitude of control signals which in the illustration of FIG. 1 are indicated by arrows.

Thus the control and/or regulating device 19 is at all times in a position to move or align in a controlled manner, in a spatially unrestricted manner, all the positioning devices within the device 1.

To supplement the control and/or regulating device 19 as well as the neuronal network 20, furthermore a manual control device 21 is provided which makes it possible for a user to manually intervene in fully-automatically running positioning processes within the device 1. A double arrow between the manual control device and the control and/or regulating device 19 illustrates an optional reaction by the control and/or regulating device 19 or by the neuronal network 20 to the manual control device 21. In this way, in a case where, for example, a positioning device with a subassembly component taken up therein moves against an obstacle and/or against a further subassembly component and/or is subjected to high mechanical loads, feedback that can be experienced in a haptic or tactile manner can be given to a user so that, for example, positioning errors can be pointed out early even without visual contact. Tactile feedback to a user can, for example, be generated by mechanical vibration whose frequency and/or intensity is, for example, proportional to a force that mechanically acts on the positioning device in the case of an error. As an alternative, an activation force of the manual control device can be increased in a defined stepped manner.

In principle, the signals of the manual control device 21 have priority over the control signals transmitted by the neuronal network 20 and/or by the control and/or regulating device 19 to the actuators of the positioners. In this arrangement, for safety reasons, the manual control device 21 is designed in such a manner that a user can preferably in each case spatially move only one positioning device at a time by means of at least one actuator situated therein and controlled by the manual control device 21. Moving the positioning devices in manual control mode as a rule takes place on the basis of visual monitoring by the user. All the positional changes of the subassembly components and of the positioners, which changes that are carried out by means of the manual control device 21, or changes in the geometric shape of the subassembly components, which changes are caused by movement of the positioners, are, for example, acquired by means of the laser tracker 13 and are forwarded to the control and/or regulating device 19 as well as to the neuronal network 20 so that said control bodies are at all times informed about the current actual state of the device 1.

After taking up the subassembly components by means of the positioners or the holding devices provided on the holding arms of the positioners, the subassembly components, which as a rule because of their size are flexible, by corresponding movement of the positioners within the device are first brought to assume the desired geometric shape as determined in the construction specifications. Since deformation of the subassembly components is governed by extremely complex non-linear mathematical rules, in this phase the positioners are preferably controlled exclusively by the neuronal network 20. In this process, by means of the measuring sensors, constant control of the mechanical loads and movement paths acting on the subassembly components takes place, which load must not exceed the predetermined limit values so that irreversible deformation is prevented. In this process the measuring of forces takes place on a multitude of different measuring points that are representative for this, preferably in the region of the holding arms or of the holding devices of the positioning devices.

After the subassembly components have attained their desired geometric shape (3D-geometry) as determined in the construction specifications, preferably under the sole control of the control and/or regulating device 19, movement of the subassembly components takes place by the positioners until a desired position provided for the tacking and/or joining process has been reached. After the subassembly components have been made to assume the desired geometric shape by means of the neuronal network 20, simultaneously carried-out linear traverse movements of the positioning devices are sufficient to reach a position of the subassembly components where they can be joined and/or tacked, and consequently the control effort and/or regulating effort is significantly reduced. Generally speaking, the control and regulating device 19 is predestined for monitoring such linear traverse movements of the subassembly components, which once the desired geometric shape has been accomplished are (notionally) to be regarded as being rigid.

The process of movement until a position has been reached in which the subassembly components can be tacked and joined, can, however, either as a supplement or as an alternative also be controlled solely by the neuronal network 20. In order to minimise the alignment times in all cases, all the positioners are always preferably moved simultaneously. Switching over or mixing the control signals for the actuators in the positioning devices, which control signals have been generated by the control and/or regulating device 19 as well as by the neuronal network 20, takes place by switches or mixers (not shown in FIG. 1).

Apart from this, within the device 1, tacking devices (also not shown) can be provided that preferably operate fully automatically and that can be controlled by means of the control and/or regulating device 19 as well as by means of the neuronal network 20. As soon as the subassembly components have reached the desired position provided in relation to the particular tacking process, provisional joining (tacking) of the above-mentioned components can take place by means of a tacking device. Such position fixing can, for example, take place by means of tacking rivets, permanent magnets and/or electromagnets.

In a further stage of improvement, for the purpose of increasing the degree of automation, the device 1 can also comprise joining devices (not shown). With the additional integration of tacking devices and joining devices, by means of the device 1 a complete fuselage section for an aircraft can be produced fully automatically from the subassembly components.

Below, the sequence of the method according to the invention is to be explained in more detail.

First the subassembly components in the form of the two side shells 7, 8, the lower shell 11, the upper shell 12 as well as the at least one floor structure (not shown) are taken up and their position is fixed by means of the holding arms and the holding devices located at the ends of the aforesaid, which holding devices are in each case provided on the side shell positioners 2, 3, on the lower shell positioner 4, on the upper shell positioner 5 as well as on the presentation frame or on the floor structure positioner.

Subsequently the positioners, preferably controlled by the neuronal network, are moved until each subassembly component assumes a geometric shape that corresponds to the CAD design data. In this state the subassembly components can be considered to be approximately rigid components which by means of translatory linear traverse movements of the positioning device can be moved relative to each other with little control-oriented and/or regulation-oriented effort to a position where they can be tacked and/or joined.

After this the subassembly components are moved until a tacking and joining position has been reached. Generally speaking the control and/or regulating device 19 is sufficient to control this movement process, because as a rule this then only needs linear, in other words translatory, traverse movements. As an alternative, the movement process to the point where a position of the subassembly components is reached in which they can be tacked or joined can, however, be controlled, in a supplementary manner or exclusively, by the neuronal network 20.

Before the neuronal network 20 can be used for controlling and/or regulating the sequences within the device 1, an extensive teach-in phase or trial phase must be carried out.

For this purpose the same subassembly components are taken up in the positioners as are subsequently to be positioned in the regular method-related process by means of the neuronal network 20. After the subassembly components have been taken up by the positioning devices, said subassembly components are moved in a controlled manner by the neuronal network 20 until the predetermined desired geometric shape of the subassembly component has been attained or until at least two subassembly components have been moved to a position relative to each other in which they can be tacked or joined. In this process the position data, determined by the laser tracker 13, relating to the subassembly components, as well as the further physical data taken up by the measuring sensors, is continuously coupled into the neuronal network in order to, in this iterative trial and error process, step by step optimise the control and/or regulating characteristics of the neuronal network 20 in terms of the fastest possible and at the same time highly accurate alignment of the subassembly components. In contrast to the control and/or regulating device, the neuronal network 20 ultimately "programs" or organises itself automatically, during the trial phase or the teach-in phase, by means of the processes indicated above.

If applicable, by means of the manual control device 21, in this trial phase or learning phase of the neuronal network 20 manual corrections still need to be carried out.

After completion of this trial phase or learning phase an initial data set has been generated in the neuronal network 20. This data set forms the basis for all subsequent alignment processes of subassembly components of the same type.

Figure 2:
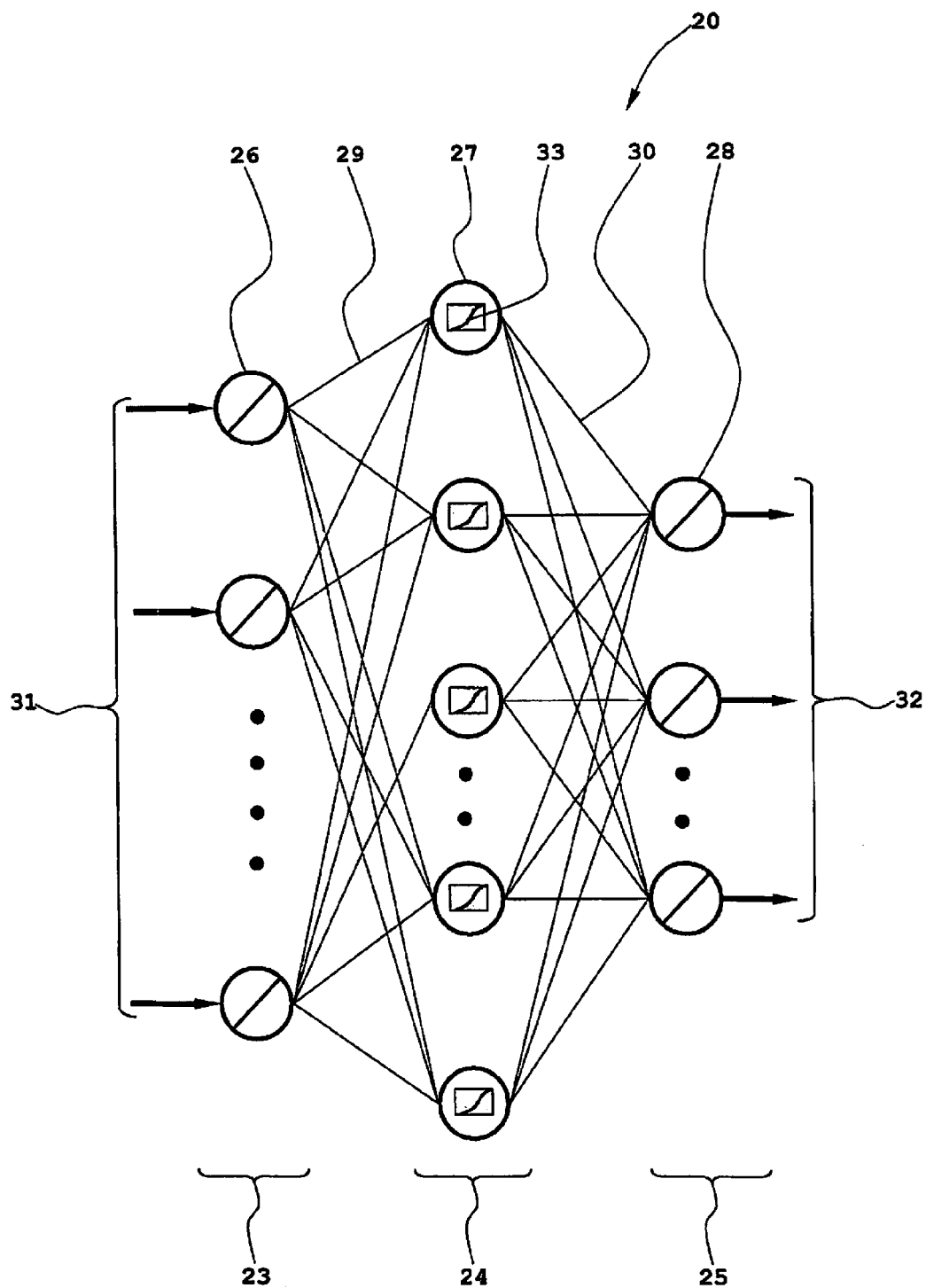
FIG. 2 is a diagrammatic view of a neuronal network that is preferably used in the device.

In an exemplary schematic diagram, FIG. 2 illustrates the possible structure of the neuronal network.

The neuronal network 20 comprises an input layer 23, a hidden layer 24 as well as an output layer 25, wherein said layers in each case comprise a multitude of neurons, of which in each case an upper neuron 26 to 28 representative of all the remaining neurons has been assigned a reference character. In each case between the neurons a multitude of weighted connections exist of which only two connections 29, 30, representative of the remaining connections, have been assigned a reference character. Input signals 31 present at the input layer 23 are transformed by means of the neuronal network 20 into output signals 32 that queue at the output layer 25 and can be tapped for further processing.

By means of the weighting of a product of the weighted connections and activation of the neurons contained in the hidden layer 24, the output signals 32 can be derived, with the use of elaborate mathematical functions, from the input signals 31, wherein one of these mathematical functions representative of all the remaining mathematical functions has been assigned the reference character 33.

The input signals 31 in the neuronal network 20 are any physical measured data, preferably, however, the positioning data of the positioning devices and/or of the associated subassembly components within the device, as well as measured values of the mechanical loads or forces acting on said components. Moreover, velocity values and/or acceleration values of said components can be fed or coupled as input signals 31 into/in the neuronal network 20. After a likewise still required measuring-oriented adaptation, the output signals 32 queuing at the output layer 25 can be used, in particular, for controlling the actuators that are necessary for moving the positioning devices.

LIST OF REFERENCE CHARACTERS

1 Device
2 Side shell positioner
3 Side shell positioner
4 Lower shell positioner
5 Upper shell positioner
6 Coordinate system
7 Side shell
8 Side shell
9 Holding arm
10 Holding arm
11 Lower shell
12 Upper shell
13 Laser tracker
14 Reflector (marking)
15 Measuring sensor (side shell positioner)
16 Measuring sensor (side shell positioner)
17 Actuator (side shell positioner)
18 Actuator (side shell positioner)
19 Control and/or regulating device
20 Neuronal network
21 Manual control device
22 Databus
23 Input layer
24 Hidden layer
25 Output layer
26 Neuron
27 Neuron
28 Neuron
29 Connection
30 Connection
31 Input signals
32 Output signals
33 Function

What is claimed is:

1. A device for spatially aligning at least two large-format subassembly components, relative to each other for integrating a fuselage section of an aircraft, comprising:
   a) at least two positioning devices for taking up in each positioning device a large-format subassembly component, the at least two positioning devices selected from the group consisting of at least two side shell positioners, at least one upper shell positioner, at least one lower shell positioner, and combinations thereof;
   b) at least one measuring device for acquiring a multitude of measured data, the measured data including positioning data relating to the large-format subassembly components and/or to the positioning devices;
   c) at least one control and/or regulating device, including at least one CNC (Computer Numerical Control) control system for controlling a simultaneous linear traverse movement of the positioning devices of the large-format subassembly components until a desired position has been reached, wherein the desired position is a position for tacking and/or joining the at least two large-format subassembly components; and
   d) at least one neuronal network for controlling a simultaneous movement of the positioning devices of the large-format subassembly components to assume a desired geometric shape which is predefined in a CAD (Computer Aided Design) component data.

2. The device according to claim 1, wherein by means of the at least one measuring device a spatial position of the large format subassembly components and/or of the positioning devices can be acquired.

3. The device according to claim 2, wherein the at least one measuring device comprises at least one laser tracker and/or at least one photogrammetric system.

4. The device according to claim 1, wherein the neuronal network is designed so as to be hardware-based and/or software-based, within the at least one control and/or regulating device.

5. The device according to claim 1, wherein the positioning data relating to the large format subassembly components, which positioning data has been acquired by the at least one measuring device, is conveyed to the control and/or regulating device and to the neuronal network.

6. The device according to claim 1, wherein each of the positioning devices comprises at least one holding device for taking up and releasing at least one large format subassembly component, wherein the at least one holding device is controllable by means of the control and/or regulating device and/or the neuronal network.

7. The device according to claim 1, wherein the positioning devices are controllable by means of a manual control device.

8. The device according to claim 1, wherein at least one tacking device is provided in order to fix the mutual relative positions of the large format subassembly components.

9. The device according to claim 1, wherein at least one joining device is provided in order to join the large format subassembly components.

10. The device according to claim 1, wherein in the region of the at least one positioning device at least one measuring sensor is arranged for determining further measured data, which measuring sensor is connected to the at least one control and/or regulating device and to the at least one neuronal network.

11. The device according to claim 10, wherein the at least one measuring sensor is selected from the group consisting of a force transducer, for acquiring deformation relating to the large format subassembly components; a displacement transducer, for acquiring positioning data relating to the positioning devices; an angle of rotation transducer; a velocity transducer; an acceleration transducer; a temperature transducer; and/or an atmospheric humidity sensor.

12. A method for spatially aligning at least two large-format subassembly components relative to each other for integrating a fuselage section of an aircraft with at least two positioning devices, comprising the following steps:
   a) inserting a large format subassembly component in each one of at least two positioning devices, the at least two positioning devices selected from the group consisting of at least two side shell positioners, at least one upper shell positioner, at least one lower shell positioner, and combinations thereof;
   b) simultaneously moving the positioning devices under control of at least one neuronal network and of at least one measuring device until a predetermined desired geometric shape which is predefined in a CAD (Computer Aided Design) component data has been reached;
   c) acquiring positioning data of at least two large-format subassembly components and/or of the positioning devices by means of a measuring device to determine an actual position; and
   d) aligning the at least two large-format subassembly components in a controlled manner by at least one control and/or regulating device including at least one CNC (Computer Numerical Control) control system by simultaneously moving the positioning devices through a linear traverse movement based on an actual position of each of the at least two large-format subassembly components acquired by the measuring device and/or by the measuring sensors until a desired position has been reached, wherein the desired position is a position for tacking and/or joining the at least two large format subassembly components.

13. The method according to claim 12, wherein a trial phase teaching of the at least one neuronal network takes place until the neuronal network achieves adequate correctness of its statements and an initial data set for a first method-related procedure with the neuronal network is generated.

14. The method according to claim 12, wherein an initial data set during the method-related process is improved step by step by continuous feed-in, to the at least one neuronal network, of position data determined by the at least one measuring device, and/or by the measured data determined by the at least one measuring sensor.

* * * * *